(12) United States Patent
Bose et al.

(10) Patent No.: US 6,584,146 B2
(45) Date of Patent: Jun. 24, 2003

(54) SYSTEMS AND METHODS FOR WIRELESS COMMUNICATIONS

(75) Inventors: Vanu Bose, Cambridge, MA (US); John Chapin, Arlington, MA (US); Andrew Chiu, Somerville, MA (US)

(73) Assignee: Vanu, Inc., Cambridge, MA (US)

( * ) Notice: Subject to any disclaimer, the term of this patent is extended or adjusted under 35 U.S.C. 154(b) by 78 days.

(21) Appl. No.: 09/781,349

(22) Filed: Feb. 12, 2001

(65) Prior Publication Data

US 2002/0035633 A1 Mar. 21, 2002

Related U.S. Application Data

(63) Continuation of application No. 09/231,335, filed on Jan. 13, 1999.
(60) Provisional application No. 60/182,004, filed on Feb. 11, 2000, and provisional application No. 60/193,979, filed on Mar. 31, 2000.

(51) Int. Cl.[7] .............................. H04B 1/38; H04L 5/16
(52) U.S. Cl. ....................... 375/219; 375/316; 375/295; 370/330; 455/418
(58) Field of Search ................................. 375/219, 316, 375/295, 259, 222, 223, 220; 455/418, 103; 370/330, 336, 345

(56) References Cited

U.S. PATENT DOCUMENTS

| | | | |
|---|---|---|---|
| 5,025,369 A | | 6/1991 | Schwartz |
| 5,418,818 A | * | 5/1995 | Marchetto et al. ........... 375/264 |
| 5,579,341 A | * | 11/1996 | Smith et al. ................ 375/267 |
| 5,768,268 A | * | 6/1998 | Kline et al. ................ 370/330 |
| 6,032,028 A | * | 2/2000 | Dickey et al. .............. 455/110 |
| 6,091,765 A | * | 7/2000 | Pietzold et al. ............. 375/219 |

FOREIGN PATENT DOCUMENTS

WO    WO 99/37099    7/1999

OTHER PUBLICATIONS

Bose, Vanu. The Impact of Software Radio on Wireless Networking. *Mobile Computing and Communications Review* 3, 30–37 (1999).
Bose, Vanu et al. Virtual Radios. *IEEE Journal on Selected Areas in Communications* 17, 591–602 (Apr. 1999).
Bose, Vanu et al. Virtual Sample Processing: Extending the Reach of Multimedia. *Multimedia Tools and Applications* 5, 259–276 (1997).
Kim, Hyoung Joong & Kim, Hyung Soo. Cost–Effective Parallel Processing for Remote Sensing Applications. *IEEE* 1, 405–407 (1996).
Kum, Ki–Il et al. Multiprocessor Scheduling of a Signal Flow Graph for Workstation Clusters. *IEEE* 1364–1367 (1997).
Sung, Wonyong et al. Multiprocessor Implementation of Digital Filtering Algorithms Using a Parallel Block Processing Method. *IEEE Transactions on Parallel and Distributed Systems* 3, 110–120 (Jan. 1992).
Tennenhouse, David L. & Bose, Vanu G. The Spectrum Ware Approach to Wireless Signal Processing. *Wireless Networks* 2, 1–12 (1996).

* cited by examiner

*Primary Examiner*—Phuong Phu
(74) *Attorney, Agent, or Firm*—Ropes & Gray (57) ABSTRACT

Systems and methods including a wireless communications device that consists of a collection of one or more processing elements, optionally forming a computer cluster, that together carry out the functions necessary to exchange information over a plurality of wireless communications links, wherein the communication links may employ different communication protocols, respectively. The systems and methods combine two techniques: the use of multiple flexible processing elements, and a design in which each of the elements can carry out any part of the processing performed by the device, including without limitation the physical, MAC, link, network, transport, and presentation layer processing.

18 Claims, 3 Drawing Sheets

SYSTEMS AND METHODS FOR WIRELESS COMMUNICATIONS

REFERENCE TO RELATED APPLICATIONS

This case is a continuation of application Ser. No. 09/231,335 entitled SYSTEMS AND METHODS FOR WIRELESS COMMUNICATIONS and filed Jan. 13, 1999, and U.S. Provisional Patent Application Ser. No. 60/182,004 entitled SYSTEMS AND METHODS FOR WIRELESS COMMUNICATIONS and filed Feb. 11, 2000, and U.S. Provisional Patent Application Ser. No. 60/193,979 entitled SYSTEMS AND METHODS FOR WIRELESS COMMUNICATIONS filed Mar. 31, 2000, all naming Vanu Bose as an inventor, all of which having their contents incorporated by reference herein.

FIELD OF THE INVENTION

The invention relates in general to communication systems and in particular to wireless communication systems that can communicate audio, video and data signals.

BACKGROUND OF THE INVENTION

The field of wireless telecommunications has grown rapidly in recent years, and the demand for wireless telecommunication services and equipment continues to grow. This notable growth is due, in part, to the proliferation of new communication standards and the development of new hardware technologies. For example, the successful adoption of cellular telecommunication standards has promoted the growth of the cellular telephone industry and driven the development of smaller and more power efficient cellular telephones that incorporate new hardware technologies that provide for greater conversion rates between the analog and digital domain, and greater digital signal processing power.

Although the new these new standards and hardware technologies have provided a slew of new devices that often work exceptionally well, these devices are generally dedicated to a specific application and communication protocol. Usually, support for a new application or standard requires replacement of hardware. In the case of infrastructure devices such as base stations, especially in the case of the large infrastructure networks operated by leading service providers, the cost of hardware replacement to support a new application or standard is extremely high. The high cost significantly reduces the rate at which new communications technologies and their benefits are introduced into the marketplace.

To address this issue, multi-modal devices have been created wherein a single hardware device that can be located at a base station may support more than one communications standard. These devices, however, require that the standard to be supported be pre-selected, typically at the time of installation or reinstallation. Once the standard is selected, the device will support the selected standard, until a reinstallation occurs and the device is reconfigured. Although valuable, such multi-modal devices do not fulfill the need for flexibility in wireless communications infrastructure. For example, current base stations provide static processing resources and processing capability dedicated to each standard and application. Thus, it is these systems do not provide much support in an environment with changing user demands.

The proliferation of protocols and devices capable of communicating using only one or two standards has also created interoperability problems. Many pairs of devices cannot communicate effectively because of their use of different standards and of different portions of the radio frequency spectrum. The interoperability problem appears as though it will continue to grow, as advances in communications technologies lead to new standards with sufficient advantages to gain wide use despite the incompatibility of devices that use them with older devices.

SUMMARY OF THE INVENTION

Accordingly, there is a need in the art for communications devices that are readily modified, thereby providing telecommunications service providers with a facile method for deploying support for new standards, and capable of supporting multiple communications standards simultaneously, thereby improving interoperability and reducing the cost of deploying new standards that coexist with existing standards.

Further, there is a substantial need for wireless communication systems and devices capable of exchanging information via multiple communications standards simultaneously in order to act as a translator or patch between non-interoperable communications devices.

Thus it is one object of the invention to provide communication systems, including processing platforms, base stations, routers and patches, that more easily and completely service multiple air standards.

It is a further object of the invention to provide systems and methods to provide wireless communication infrastructure that is more cost efficient to upgrade and deploy.

Still other objects of the invention remain, and these objects will, in part, be set forth below and, in part, be obvious to one of ordinary skill in the art.

The systems and methods described herein provide wireless communications devices, including infrastructure such as base stations, patches and routers, for supporting wireless communications. The invention, in one aspect, consists of a collection of one or more processing elements that together carry out the functions necessary to exchange information over a plurality of wireless communications links. The systems and methods described herein combine two techniques: the use of multiple flexible processing elements, and a design in which each of the elements can carry out any part of the processing performed by the device, including without limitation the physical, MAC, link, network, transport, and presentation layer processing. Unlike previous communications devices, the systems and methods of the invention can easily and quickly change the communications standards supported, can support multiple communications standards at the same time, and can scale in a cost effective manner to support large numbers of communications channels simultaneously.

The systems and methods described herein shall be collectively referred to as a Multi-Layer Processing System, MLPS 12 for short, herein.

More specifically, the invention includes systems for implementing a communications process for communicating via a plurality of wireless communication protocols, comprising a cluster having two or more processing elements with a processor having a memory management unit capable of supporting an operating system that separates application-level and system-level address spaces. The processing units may be connected by a data network, such as an ethernet network, for supporting data communication among the processing elements. Application programs, which shall be understood as programs executing within the application-level space of the processing elements, collectively perform the signal processing of IF signals that are part of the physical layers of the wireless communication protocols.

The two or more processing elements may be arranged as a cluster and in one embodiment are selected from the group consisting of workstations, and workstation motherboards. Typically, the processing elements include a processor or CPU, memory, and I/O interface. The cluster may comprise locally arranged processing elements or processing element that are disposed at remote locations relative to each other.

The systems may further include programs for performing one or more of the physical, MAC, link, network, transport, or presentation layer processing functions for communicating via a wireless communication protocol. The processing of signals preferably occurs in real time, such that programs executing within application-level space for processing IF signals, process IF signals for transmission within a latency period corresponding to an associated wireless communication protocol.

The systems and methods described herein leverage the flexibility of the cluster architecture to allow the wireless communication systems described herein to support different wireless protocols or network standards, and to change the amount of support given to any particular standard, or to change the actual standards supported. To this end, the systems described herein may include a configuration module for selectively activating one of the application-level programs for processing signals according to a selected wireless communication protocol. The configuration module may include a process for removing support for a wireless communication protocol by sending a message to the executing application-level programs performing processing functions in support of the specified protocol. Such a message would typically include instructing for changing internal configuration into a configuration in which these functions are not carried out. The configuration module may also include a process for increasing the processing capacity dedicated to support a selected wireless communication protocol, wherein the configuration module causes additional processing elements to support the specified protocol to begin performing such processing. Alternatively, the configuration module may include a process for decreasing the processing capacity dedicated to support a selected wireless communication protocol, wherein the process causes at least some of the processing elements to cease supporting the specified protocol.

In other embodiments, the invention provides systems for implementing a communications process for communicating via a plurality of wireless communication protocols. These systems can include a cluster having two or more processing elements, each having a plurality of processors each containing a memory management unit capable of supporting an operating system that separates application-level and system-level address spaces. A data network may also be included for supporting data communication among the processing elements. In this embodiment, the interface for the data network may be attached to an I/O bus of each element. For processing, the systems may include programs executing in the respective application-level space of the two or more processing elements to collectively perform the signal processing of IF signals required for the physical layer of the wireless communication protocols.

In still other embodiments, the invention provides systems for supporting multiple air standards. These systems include a plurality of cellular switches each capable of carrying data associated with a call. The systems also include a central processing system coupled to the plurality of cellular switches and having a plurality of software processing mechanisms each capable of exchanging data with a respective one of the cellular switches. The central processing system processes the exchanged data for modulating and demodulating the data according to an air standard associated with the respective one of the cellular switches, to thereby provide to data suitable for being carried on a transmission frequency associated with the air standard.

In another aspect, the invention provides methods for wireless communication, including methods for allowing an air carrier to select an air standard for transmitting data on a computer network or data network over a wireless network. These methods may include the following operations allowing the air carrier to transmit data to a signal processing station, at the signal processing station identifying an air standard associated with the data or computer network of the air carrier, directing the signal processing system to process the data according to the selected air standard, and presenting modulated data to a wireless network for transmission over the wireless network to a wireless user.

In certain operations, the invention includes methods for a base station to process a given transmission in accordance with an air standard appropriate for that transmission. These methods may include the operations of having a mobile switch station attach a tag to information sent to the base station requesting a transmission of data, which tag identifies the air standard appropriate for that transmission, providing a process in the base station that reads the tag and forwards the transmission request to the process in the base station corresponding to that tag, which correspondence is stored in the base station, and having the process perform the signal processing in accordance with the specified air standard such that the data is formatted appropriately for transmission via that air standard. Optionally, the methods may include the operations of having the mobile switch transmit the data on a connection to an independent base station, directing an application in the base station that retrieves the data from that connection to attach a tag identifying the base station corresponding to the connection, and allowing the base station to process the transmission as if the tag had been attached by the mobile switch.

In still a further embodiment, the methods described herein provide for real-time communication between devices of different air standards. These methods may include the operations of having a system retransmit as a patch device, retransmitting any information received through one wireless communication protocol, detecting a party communicating via one of the protocols having reserved the channel for transmission, and executing the mechanisms appropriate to reserve the transmission channel on remaining configured protocols, and detecting the channel reservation acquired by the party has been released, and releasing the reservation acquired on the remaining configured protocols.

Employing the methods and systems referenced above, the invention may also provide real-time communication systems functioning as a router between two or more wireless networks. Such routers may employ a local-area data network, such as any of the known local data networks including those selected from the group consisting of IEEE802.11 and Bluetooth.

BRIEF DESCRIPTION OF THE FIGURES

The foregoing and other objects and advantages of the invention will be appreciated more fully from the following further description thereof, with reference to the accompanying drawings wherein.

DESCRIPTION OF CERTAIN ILLUSTRATIVE EMBODIMENTS

The systems and methods described herein include systems that use software to do the signal processing, including for example the channel selection, modulation and demodulation, for supporting data transmission at a selected air standard across a wireless network. These systems are understood as multi-layer processing systems (MLPS). The MLPS 12 may perform without limitation some or all of the following processes, which are categorized according to the OSI network model: Physical Layer, including, without limitation, channel selection, modulation and demodulation, radio spectrum multiple access, channel coding and decoding, encryption and decryption; MAC Layer, including, without limitation, multiple access protocol implementation; Link Layer, including, without limitation, framing and error correction and detection; Network Layer, including, without limitation, routing, gateway/firewall and error correction and detection; Transport Layer, including, without limitation, quality of service and error correction and detection; and Presentation Layer, including, without limitation, content transcoding or other distillation techniques. For an example of Transport Layer functionality usefully performed in a switch or gateway, see Balakrishnan, H., Seshan, S., Katz, R. H., Improving Reliable Transport and Handoff Performance in Cellular Wireless Networks, ACM Wireless Networks, 1 (4), December 1995. For an example of Presentation Layer functionality usefully performed in a switch or gateway, see Armando Fox, Ian Goldberg, Steven D. Gribble, David C. Lee, Anthony Polito, and Eric A. Brewer, Experience With Top Gun Wingman: A Proxy-Based Graphical Web Browser for the 3Com PalmPilot, Proceedings of Middleware '98, Lake District, England, September 1998.

The MLPS 12 described herein include, but are not limited to, embodiments that operate as bridges, interfaces, gateways, repeaters or switches. Such systems are connected to a plurality of communications links, some of which may be wired and some of which may be wireless, and are capable of exchanging information over each link according to the communications standard specified for that link. As will be described below, the MLPS 12 is capable of reallocating installed processing resources, such that each processing element can be used to support any of the communication standards by which the system communicates, and this reallocation can be done with reduced or with no interruption of the processing being performed by other processing resources. Additionally, the MLPS 12 employs these reallocable processing resources to perform some or all of the signal processing required by the physical layer of the communication standards by which the system communicates, in addition to using these resources to perform the processing required by higher layers.

For example, the systems described herein may be employed for processing data that is transmitted across a communication network, such as the public switching telephone network (PSTN), to modulate the data for transmission over a wireless network. In one practice, the systems may be realized as centralized systems where the mobile telephone switching office (MTSO) or cellular switches, of a wireless network are connected into communication with a centralized signal processing system. The centralized signal processing system may be a software system that provides signal processing for one or more air standards employed by the communication networks associated with the MTSO switches. Accordingly, it will be understood that in one embodiment a base station system may be formed by employing the systems and methods described herein wherein the base station system comprises antennae with transducers connected to a cluster of computers via a high-speed network. The customer network, whether it is voice, data, video traffic, or some other type of data, may also be connected to the cluster and the cluster will perform the signal processing to transform the signal received from the antenna transducers to the format suitable for the customer network and vice-versa.

In one particular practice the MTSO switch may perform the conventional process of identifying an antenna, or cell, for supporting communication services to a mobile customer. The customer data, which may be voice, or data, and is typically at the data network band, may be provided to a cluster based signal processing unit that may perform the modulation, and alternatively demodulation, to exchange data between the base band and the RF band of the air standard. Once the centralized cluster based signal processing unit has modulated the customer data, the switch may direct the modulated data to the antenna that supports communications with the mobile customer. At the antenna, in one embodiment, an RF modulation transceiver is provided that can modulate data up to the broadcast band for transferring the data over the wireless network. For the systems described herein the RF modulation transceiver may be a conventional modulation transceiver that will, if necessary, modulate an IF signal up to the carrier frequency for transmission over the wireless network. However, in some embodiments and applications it will be understood that the carrier frequency for the IF signal maybe zero, and it will be understood that the term IF signal is to encompass IF signals having no, or substantially no carrier, and will include, without limitation, baseband signals. For each air standard protocol supported by the systems described herein, the same type of generic modulation device may be employed as the carrier frequency for each of these protocols is similar. Modulating an IF signal up to a carrier frequency can employ any of the known techniques including those set forth in J. Chapin, A. Chiu, and R. Hu, "PC Clusters for Signal Processing: An Early Prototype", IEEE Sensor Array and Multichannel Signal Processing Workshop, Cambridge, Mass., March 2000; V. G. Bose, D. J. Wetherall and J. V. Guttag, "RadioActive Networks: Freedom from the Worst Case Design", Mobicom '99, Seattle, Wash., August 1999; A. B. Shah, V. G. Bose, "Accelerating Evolution of the Cellular Infrastructure using Software Radios," Massachusetts Telecommunications Council 4th Annual R&D Conference, June 1999;V. G. Bose, "The Impact of Software Radio on Wireless Networking," Mobile Computing and communications Review, Volume 3, No. 1, January 1999; M. Ismert, "Making Commodity PCs Fit for Signal Processing," *USENIX* '98, New Orleans, June 1998; V. Bose, M. Ismert, M. Welborn, J. Guttag, "Virtual Radios," IEEE/JSAC, Special Issue on Software Radios, April 1999; V. G. Bose and A. B. Shah, "Software Radios for Wireless Networking," *Infocomm* '98, San Fransisco, April, 1997; and V. G. Bose, A. G. Chiu and D. L. Tennenhouse, "Virtual Sample Processing: Extending the Reach of Multimedia," Multimedia Tools and Applications, Volume 5, No. 3, 1997; and D. L. Tennenhouse, V. G. Bose, "The Spectrum Ware Approach to Wireless Signal Processing," *Wireless Networks*, Volume 2, No. 1, 1996; all of the above publications being incorporated herein by reference.

In other embodiments, the systems and methods described herein may provide for distributed signal processing of customer data to allow the customer data to be modulated up to the information band (IF) of the air standard. Each antenna can have a programmable modulation device for transferring customer data to the proper broadcast band, and for demodulating RF data down to a band suitable for transfer across a data network.

Figure 1:
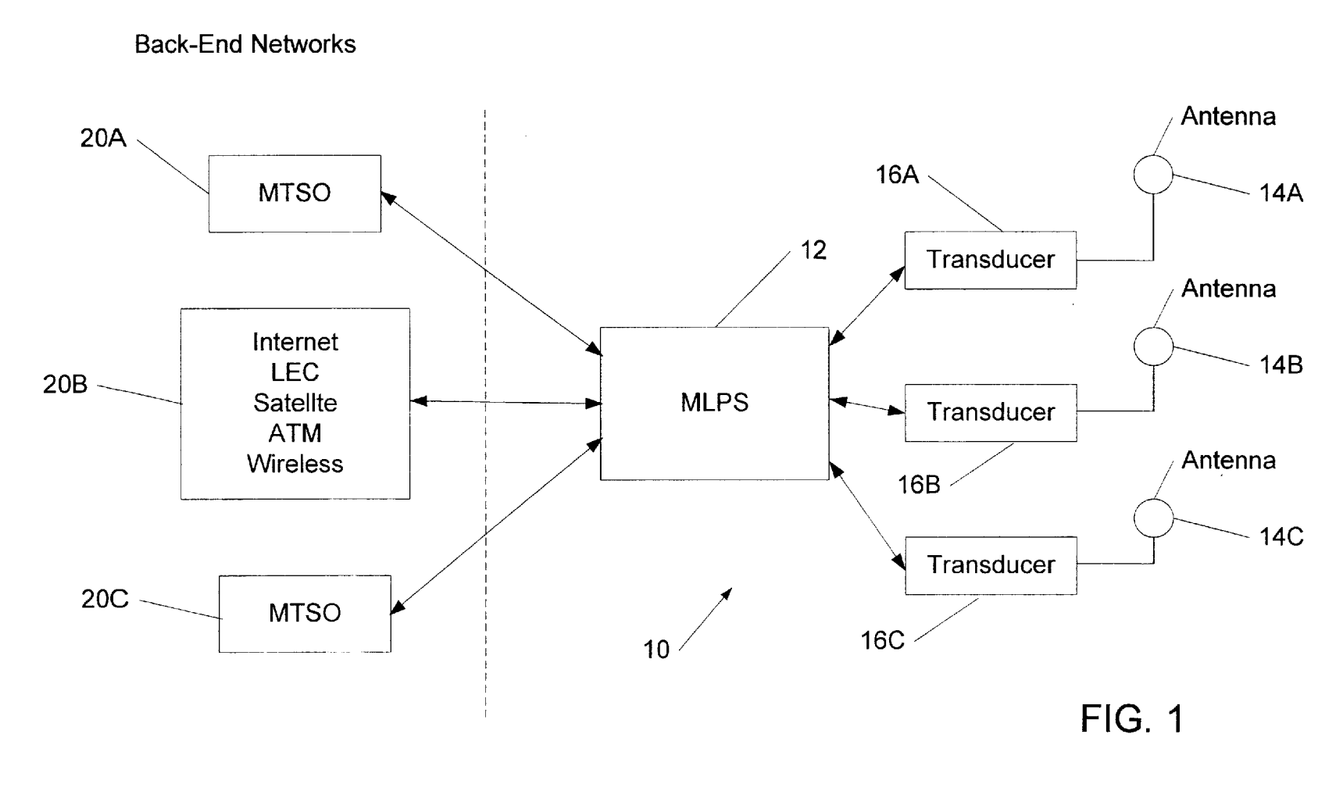
FIG. 1. depicts one system according to the invention.

In FIG. 1, one system 10 according to the invention is depicted. Specifically, FIG. 1 depicts a system 10 wherein customer data provided through a plurality of MTSO or cellular switch devices, or directly by a back end network, is presented to the MLPS 12 for Physical, MAC, Link, Network, Transport and Presentation Layer processing to thereby exchange data between one or more back end networks and one or more air standards.

More particularly, FIG. 1 depicts a system 10 that includes an MLPS 12, a plurality of antennae 14A–14C, each of which communicates with wireless customers via one or more air standards, a plurality of transducers 16A–16C, one or more directly or indirectly connected back end networks 20A–C, and MTSO's 18A–B. Accordingly, it can be seen from FIG. 1 that the system 10 allows customer data from the back end network 20 to be transmitted to the MTSO's 18A–B. Each MTSO 18A–B can function as a traditional cellular switching system that can process customer data from the back end network 20, such as data presented in the SS7 format, to determine the proper cell(s) to which the customer data should be delivered for transmission to a wireless customer. MTSO's of the type depicted in FIG. 1 are known in the art, and described in detail in various references. It will be apparent to those of ordinary skill in the art that any suitable cellular switching device may be employed with the invention described herein and that although the MTSO's 18A–B are shown as separate from the MLPS 12, in alternative embodiments, the MTSO's 18A–B may be integrated into the MLPS 12. Other modifications and substitutions can be made to the system depicted in FIG. 1 without departing from the scope of the invention.

In this embodiment, the MLPS 12 may consist of a plurality of PC workstations, or a plurality of rack-mounted workstation motherboards, connected by a LAN, such as an ethernet connection. These workstations may be commercial-off-the-shelf components and all signal processing performed by the MLPS 12 is performed as standard application processes on the PC workstations.

Figure 2:
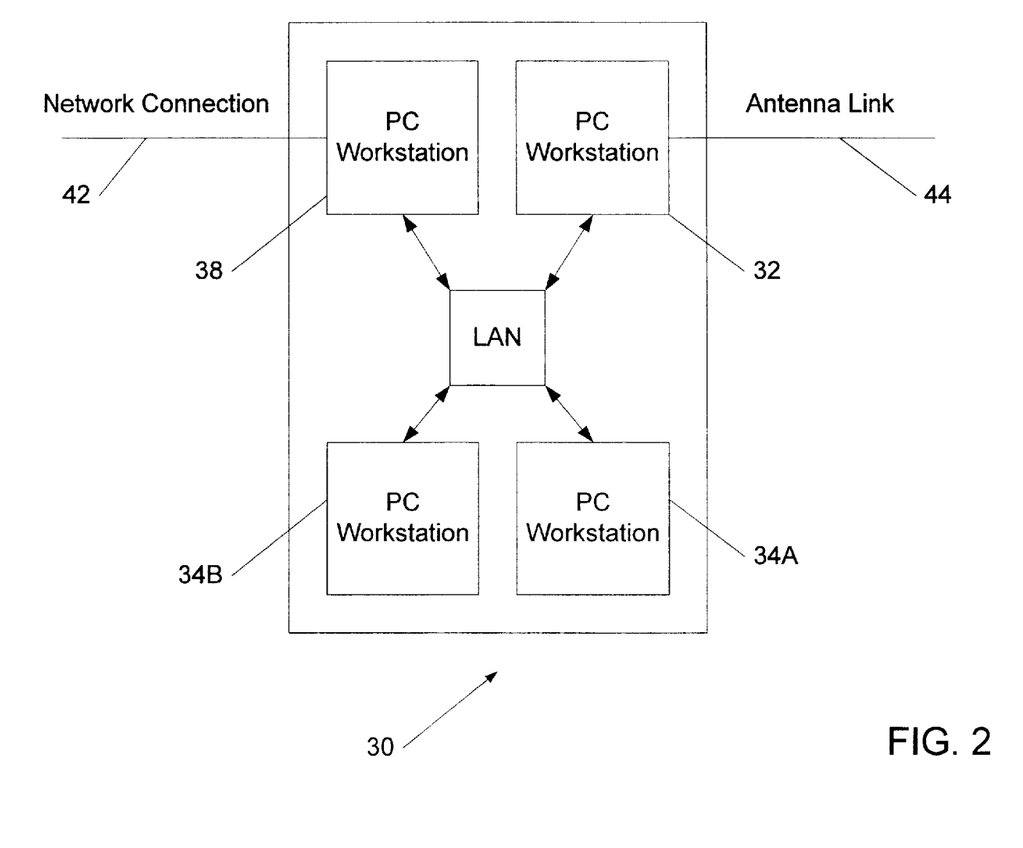
FIG. 2. depicts in greater detail one portion of a cluster processor suitable for use with this system depicted in FIG. 1.

FIG. 2, shows one of the depicted MLPS 12 in more detail. Specifically, FIG. 2 shows a portion 30 of the MLPS 12. The depicted element 32 is a PC workstation containing an interface to a remote antenna link 44, which includes analog to digital and digital to analog conversion functionality. PC workstation 32 is connected to a LAN 40, which allows PC workstation 32 to exchange data with PC workstations 34A–B and 38. PC workstation 38 contains a network interface enabling it to exchange data via a network connection 42, which may be a connection to an MTSO or a back end network such as the PSTN. PC workstation 38 is also connected to LAN 40 enabling it to exchange data with PC workstations 34A–B and 32. The portion 30 of the MLPS 12 may be employed for processing data to support the AMPS air standard. AMPS is an effective system for voice communication and for use with other information transmission systems like fax, telex or computer. For purpose of illustration the system of FIGS. 1 and 2, will now be described with reference to a system for processing the AMPS standard, however it will be apparent that other air standards may also be processed by the systems of the invention. Accordingly, it would be seen that the system depicted in FIG. 1 provides a centralized site for supporting multiple air standards, and therefore provides an air carrier with infrastructure that may be modified without hardware replacement in order to offer updated services, reallocation of resources between services, and upgraded air standards. For purposes of clarity, one embodiment of a PC cluster based signal processing system will be described with reference to FIG. 2.

The system contains the following hardware components.

| | | |
|---|---|---|
| Dell Dimension XPS R450 | 4 | 450 MHZ Intel Pentium II processor, 512 KB cache |
| | | 128 MB RAM |
| | | PCI I/O bus (32 bits @ 33 MHZ) |
| | | 3Com 3C905B 100 Mbit/sec ethernet interface (on PCI bus) |
| | | Linux 2.2 |
| Netgear FS524 switched ethernet hub | 1 | 1.2 gbit/sec backplane |
| | | 148,000 packets/sec (64 byte packets) |
| | | 60 microsec max latency |
| Gage CompuScope 1250 A/D | 1 | 10 MHZ bandwidth |
| | | 20 Msamples/sec |
| | | 12 bits/sample (padded to 16 bit data value) |
| | | installed in the PCI bus of one of the PCs |
| | | receives baseband signal from custom downconversion board |

All application software runs as normal Linux processes at user level, with the exception of the Gage driver whose function is to transfer data from the Gage card to user-level buffers. The application software is structured as a library of C++ objects, each of which performs a dedicated function such as filtering or demodulation. The objects are instantiated at run time and connected together into data-processing pipelines, in which data is pulled by the sinks rather than pushed by the sources. See V. Bose, M. Ismert, M. Welborn, and J. Guttag. "Virtual radios," IEEE Journal on Selected Areas in Communications, vol. 17, no. 4, pp. 591–602, April 1999. The library contains objects which application writers may use to splice together pipelines on separate machines into a single distributed pipeline. Data is sent over the network as a TCP stream with 4 kbyte buffers at each end. This configuration delivers 90 Mbit/sec of application data over the 100 Mbit/sec ethernet network when the machines are otherwise idle. The depicted system does not tolerate failure of a machine, however, those of ordinary skill can modify the system 30 to provide for fault tolerant performance.

The depicted PC 30 cluster performs channel selection and decoding in the AMPS cellular band, which is from 870 MHZ to 880 MHZ. In this embodiment, the processing system takes data from the transducer 16a and performs the processing to create customer level data that can be transmitted through the network interface 42 to the appropriate MTSO. It will be understood by those of ordinary skill in the art that the system can also work in reverse for processing customer data that may be transmitted from the MTSO to the transducer 16a, provided, that the Gage A/D card is replaced or supplemented with an appropriate D/A card such as the National Instruments PCI-6713, and that the output of this card is coupled to an antenna through appropriate frequency up-conversion and amplification circuits.

In this depicted embodiment the cluster was configured to perform channel selection and decoding in the AMPS cellular band from 870 MHZ to 880 MHZ. Each of the four machines 32, 34A, 34B and 38 performs a different function. Samples from the transducer 16a were collected on the band selection machine 32, which extracted two 200 kHz sections of the 10 MHZ cellular band. Each of these 200 kHz sections was sent to a channel selection machine (machines 34A and 34B). Each channel selection machine 34A and 34B extracted six 30 kHz AMPS channels from its input section and sent those channels to the demodulator 38. This machine performed FM demodulation and audio filtering on each of the voice channels and saved each audio stream to disk. In total, twelve voice channels were simultaneously produced on the demodulation machine. Connecting each voice output channel in turn to a speaker confirms that the system produces comprehensible voice output for all channels.

The system 30 can take as its input, a 20 Msample/sec sample stream representing 10 MHZ of spectrum. An FIR filter with 256 taps is used to select a 200 kHz band and produce a 200 kSample/sec complex sample stream. This operation takes 51.2 million filter operations per second (256*200000).

Each channel select machine 34A and Bexecutes six channel selection filters on its input section, producing six 30 kHz streams (oversampled at 40 kSample/sec). In this example, each channel selection filter is implemented as a polyphase FIR filter that performs frequency translation to baseband and bandwidth reduction. V. Bose, M. Ismert, M. Welborn, and J. Guttag. "Virtual radios," IEEE Journal on Selected Areas in Communications, vol. 17, no. 4, pp. 591–602, April 1999. If the band select machine were adapted to deliver a wider band, each channel select machine would be able to select at least 12 channels.

The demodulation machine executes twelve processing pipelines, each of which performs FM demodulation and filtering (using an FIR filter) and saves each audio stream to disk. Its total processor utilization for all 12 channels, including networking, is 50%.

Embodiment 2
Distributed Multiple-Cell Controller

In another embodiment, the MLPS 12 may again be used as part of a larger system that connects the public switched telephone network (PSTN) to AMPS and CDMA wireless networks.

In this embodiment, the MLPS 12 may be realized as a system where the processing elements are distributed across multiple sites. One site functions as the primary site and the others as secondary sites. In such an approach, the mobile telephone switching office (MTSO) or other cellular switches of a cellular telephone network are connected to the primary site of the MLPS 12 via a plurality of communications links. Each antenna used for wireless transmission and reception is connected directly to a secondary site of the MLPS 12. MLPS 12 processing elements at the primary and secondary sites connect to each other using the internal data network of the MLPS 12, which may without limitation be realized as dedicated communication links between the sites or as data connections provided by a network shared with other users.

In such an embodiment, the MLPS 12 can provide reallocation of processing functionality among the multiple supported wireless networks, and addition of support for a new network without hardware change, just as described in Embodiment 1.

Additionally, the MLPS 12 can provide reallocation of processing functionality among the multiple secondary sites. For example, if one of the secondary sites is a cell covering a block in a business district, while another covers a block in an area of night clubs, the MLPS 12 can dedicate more processing elements at the primary site to the business district in the daytime and more of them to the night clubs in the evening, corresponding to the expected variation in load levels of the two areas over each 24-hour period. This enables the service provider that installs the MLPS 12 to install less total channel processing capacity than would be required to support all channels of both secondary sites simultaneously, thereby reducing the cost of the system without reducing the level of service provided to customers of the wireless network.

In one variant of this embodiment, such as in a system that supports the GSM wireless network, the MTSO is designed to work with a primary site that controls multiple antenna sites, and so information exchanged between the MTSO and the primary site indicates which secondary site shall be used for a given transmission or was used for a given reception. In a different variant of this embodiment, such as in a system that supports the AMPS wireless network, the MTSO is not designed to work with a primary site that controls multiple antenna sites. In such a system, the MLPS 12 appears to the MTSO to be a collection of traditional base stations, thus there are multiple data links between the MTSO and the MLPS 12. The MTSO switch performs the conventional process of identifying a cell, for supporting communication services to a mobile customer, and selects that cell by choosing the proper data link. The MLPS 12 then selects the secondary site based on the data link chosen by the MTSO. Conversely, for information received from a mobile customer, the MLPS 12 selects the data link for communication to the MTSO based on the secondary site that received the wireless signal.

Embodiment 3
Hybrid Infrastructure

Figure 3:
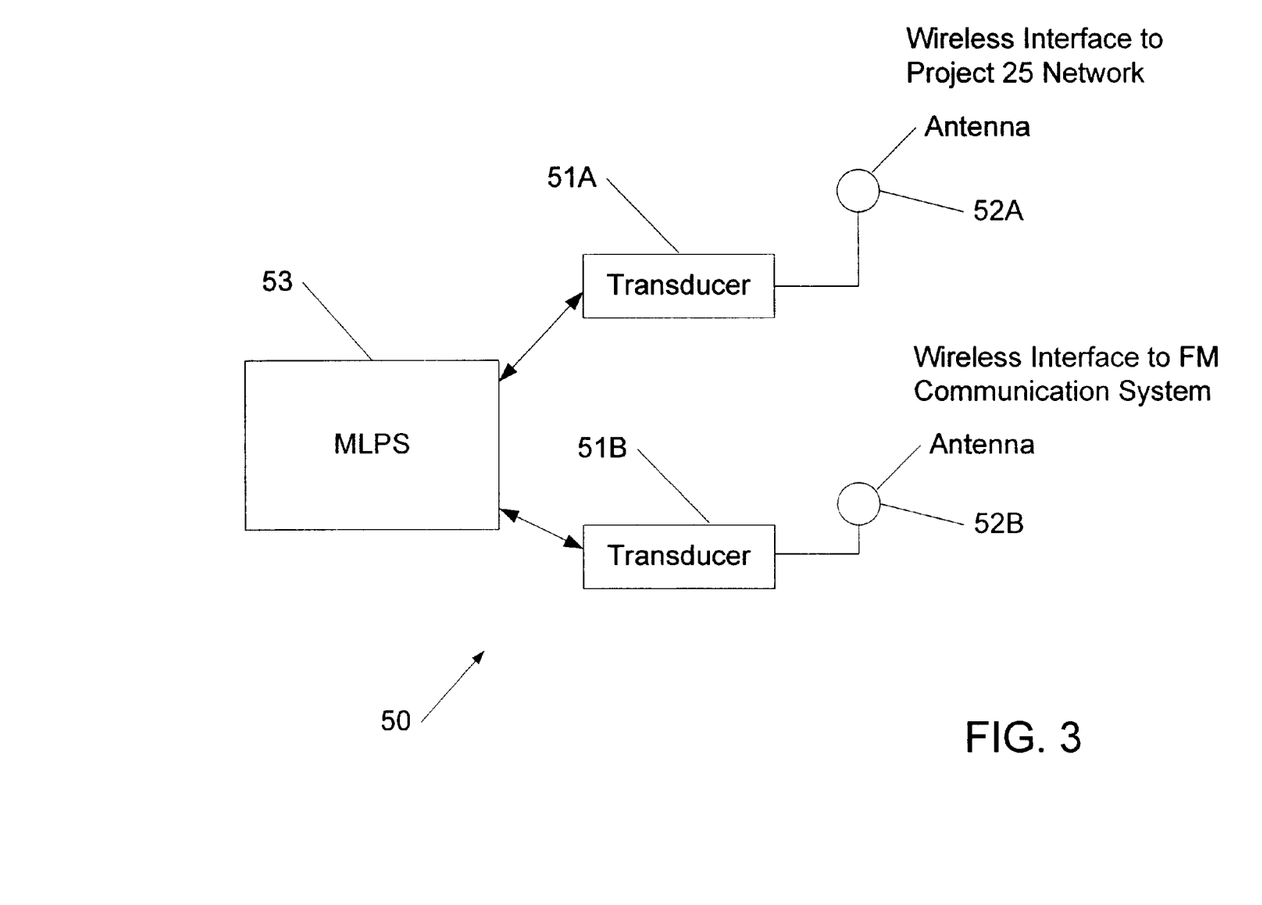
FIG. 3. depicts a further embodiment of the according to the invention herein.

In another embodiment, the MLPS 12 may function as part of two or more larger systems which are independent of each other. In one such embodiment, one of the larger systems connects the PSTN to the AMPS wireless network. Another connects a public safety agency such as a police department to a Project 25 wireless network used for emergency communications. One such embodiment is depicted in FIG. 3, which shows an MLPS 53 that exchanges signals between a transducer 51A and a transducer 51B. Each transducer 51A and B couple to a respective antenna. In this embodiment, the MLPS 53, which may be similar to the MLPS 12, may be either centralized as in Embodiment 1 above or distributed as in Embodiment 2 above. In this section, consider a centralized embodiment. The MLPS 12 is connected to multiple communication links, one or more dedicated to connect it to each of the larger systems to which the MLPS 12 belongs. In this section, consider that exactly one link connects it to each of the two systems, AMPS and public safety. The MLPS 12 is connected to one or more antennae, as in Embodiment 1 or Embodiment 2. In this section, consider that it is connected to one antenna.

In such an embodiment, when the MLPS 12 receives information such as a voice stream or data packet to be transmitted, it selects the communications standard and frequency by which to transmit that information based on the data link on which the information arrives at the MLPS 12. Conversely, when a signal is received from the antenna, the MLPS 12 chooses the outgoing data link on which to output the information in that signal based on the communications standard and frequency at which the signal is received.

In such an embodiment, the capability to dynamically reallocate the processing elements is a vital system attribute. Consider that the public safety network is used only in emergency situations, which occur rarely. It will be apparent to someone with ordinary skill in the art that the processing elements can be rapidly reallocated to perform Project 25 channel processing upon arrival of a request from the public safety agency over the data link that connects the public safety agency to the MLPS 12. Therefore in normal operation, all processing elements can be dedicated to AMPS channel processing, without preventing their use for Project 25 processing in an emergency.

Given such an embodiment, the police department will have improved communications capability in an emergency through making use of AMPS network infrastructure, compared to the current situation in which the police department must deploy its all of its own infrastructure at a high cost which limits the amount of infrastructure that can be provided. This improved emergency communications capability will be provided without hardware cost for additional processing elements in the MLPS 12, compared to the number of processing elements that would have been installed had the MLPS 12 been deployed solely to support the AMPS wireless network. It will be apparent to those with ordinary skill in the art that the MLPS 12 can be configured to provide some amount of processing capability in non-emergency situations to the Project 25 network, and to increase the communications capability provided to the Project 25 network in emergency situations while still preserving some AMPS communications capability. This approach will result in a cost increase of the MLPS 12 system compared to the situation if the MLPS 12 supported only the AMPS wireless network. However, the incremental cost of additional processing elements for use in non-emergency situations, presumably reimbursed to the AMPS service provider by the police department, will be substantially less than the cost to the police department required to deploy an entirely separate infrastructure to provide the same communications capability, because in the MLPS 12 approach the police department need not purchase and maintain the antenna, tower, site, power connection, RF amplifier, and other components required for a complete communications site.

It will be understood by those with ordinary skill in the art that a MLPS 12 capable of the behaviors described above can act as hybrid infrastructure for any collection of independent wireless networks, whether they are AMPS and Project 25 as described above or other networks not named here.

Embodiment 4

Virtual Patch

In another embodiment, the MLPS 12 may function as a bridge between two or more different wireless networks. In this embodiment, the MLPS 12 retransmits information received from any network on all other networks.

This functionality will be required in an emergency situation involving the response of multiple public safety agencies using multiple incompatible radio systems, which ordinarily would make radio communication impossible. In current practice, this problem could be overcome through the creation of physical patches between each radio of each responding agency. However, this approach does not address incompatible signaling protocols and thus will not permit users of one network to reserve a communication channel on the other network(s), and thus cannot guarantee that the transmission would be heard by the relevant parties. An MLPS 12 used to implement this patch function can perform the higher level signal processing functions in addition to the physical layer processing to enable signaling protocols to be fully implemented across multiple networks simultaneously, ensuring that transmissions reach the relevant parties.

Embodiment 5

Wireless Router

In another embodiment, the MLPS 12 may function as a router between two or more different wireless networks. In one network it will act as a base station, while simultaneously acting as a mobile client or CPE terminal in another.

This functionality will be required in situations such as the future home gateway. A home gateway serves as the base station for local wireless clients such as the thermostat, refrigerator, and security system, which communicate with the gateway over a short-range wireless network such as IEEE802.11 or Bluetooth. At the same time, it serves as a CPE terminal for a medium range wireless network that provides high-speed internet service over the "last mile" between the home and a neighborhood access point.

When a data packet is transmitted by a local client such as a security system over the short-range wireless network, the MLPS 12 performs the normal routing-layer functions of examining the contents of the packet, determining if the destination of the packet is local or remote, and retransmitting the packet on the appropriate wireless network. Similarly, when a packet is received over the last-mile wireless network, the MLPS 12 performs the normal routing-layer function of examining the contents of the packet, determining if the destination is in the local-area network, and retransmitting it in the local-area network if so.

In such an embodiment, the ability of the MLPS 12 to change the communication standards it supports without hardware changes provides significant advantages. There are many competing high-speed medium-range wireless networks at present, and a likely future situation is one in which a manufacturer who wishes to sell home gateways must support a plurality of last-mile networks with its home gateway product, with each customer choosing the last-mile network to be used in their home after acquiring the product. In current practice, the manufacturer would include multiple communication devices in the product, all but one of which would be unused after the customer selected a last-mile network, increasing the cost of the product substantially. The MLPS 12 enables the manufacturer to build a single communications device into the product, which is specialized to a particular last-mile network after installation in the customer's home without hardware changes, thereby reducing the cost of the product.

Embodiment 6
Application Platform

In another embodiment, the MLPS 12 functions as a base station as in Embodiments 1 and 2, or as a wireless router as in Embodiment 5, but additionally its processing elements are used to execute one or more applications. An application is a function that sits above all the layers of the OSI reference model described earlier, which may communicate with wireless or wired devices, compute useful information, and/or perform accounting and logging functions.

In one embodiment of the application platform, the MLPS 12 functions as a base station as in Embodiments 1 and 2, and also executes an application that implements the E911 position location functionality mandated by the FCC for future base stations. Such an application receives requests for position measurement from elsewhere in the system, examines information available in the physical layer processing modules, computes the location of the specified mobile client, and sends this location back to the requester. In current practice, implementation of the mandated E911 functionality requires installation of new processing elements and new specialized physical layer hardware at the base station site. An MLPS 12 makes it possible to install this functionality without hardware changes to the processing elements into a deployed MLPS 12, because of the two novel features of an MLPS 12: the flexible processing elements which can be adapted to perform application-layer functions, and the use of these processing elements to implement the physical layer functionality of the wireless communications standards supported by the MLPS 12, making information from the physical layer available to the E911 application.

In another embodiment of the application platform, the MLPS 12 functions as a base station as in Embodiments 1 and 2, and also executes an application that provides services to mobile clients currently in range of that base station. One such application might be to enable singles in a block of nightclubs to exchange introductory information without revealing their names or locations unless mutually desired. Use of the MLPS 12 as an application platform for such applications provides an improvement over current practice, in which all application services are executed on platforms connected to the MTSO through the PSTN or other data network. In current practice, the use of such application platforms requires that all data relevant to the application be transmitted to the remote application platforms, making applications that require high-bandwidth data interchange (such as video) expensive to implement. If the application executes wholly or partially on the MLPS 12 acting as the local base station, the high bandwidth data can in whole or in part be transmitted to the desired recipient without consuming resources in the rest of the system supporting the wireless network and without consuming resources in the PSTN.

In another embodiment of the application platform, the MLPS 12 functions as a base station for a wireless communications standard, and also executes an application that uses the functionality of that base station to test mobile client devices. Note that this embodiment is not acting as a switch or gateway, but as a self-sufficient test system. Such a test system would be an improvement on current practice for construction of test systems, because the use of the flexible processing elements of the MLPS 12 to implement physical layer processing makes information from the physical layer, which would be inaccessibly hidden inside a separate processing element in current practice, visible to the test application, thereby improving detection and diagnosis of problems in the behavior of the client device. It will be apparent to a person with ordinary skill in the art that the MLPS 12 could also be configured to act as a number of separate mobile client devices, and hence a single MLPS 12 can act as a test system for a base station device, with similar advantages compared to current practice due to visibility of physical layer information.

Embodiment 7
Development Platform

In another embodiment, the MLPS 12 may be used in a laboratory or manufacturing facility as a device for experimenting with new communications standards or new implementations of existing standards.

In such an embodiment, the MLPS 12 functions as a self-sufficient system, or is connected to a data network used in the laboratory or manufacturing facility. The MLPS 12 has a plurality of antennae, or may transmit and receive radio signals over a coaxial cable or other transmission medium. The MLPS 12 may transmit and receive radio signals to other devices, or may be configured to transmit and receive radio signals to itself, with some of its antennae or connections to the transmission medium configured as transmitters and others configured as receivers.

In such an embodiment, the ability to change the communications standard supported by the MLPS 12 without hardware changes provides substantial advantages. In current practice, researchers studying new communications standards and developers building new implementations of standards are significantly constrained in their ability to run experiments, due to the cost of the hardware changes required in communications systems and the time required to make these changes. An MLPS 12 reduces this cost and the time required to change the behavior of the communications device, thereby enables more rapid experimentation, and hence improves the process of designing new standards or developing new implementations of communications standards.

Those skilled in the art will know or be able to ascertain using no more than routine experimentation, many equivalents to the embodiments and practices described herein. For example, it will be understood that the systems and methods described herein can be employed for developing baseband communication systems, as well as system for developing baseband applications. Such techniques are disclosed in H. J. Kim and H. S. Kim. "Cost-effective parallel processing for remote sensing applications," 1996 *International Geoscience and Remote Sensing Symposium*, vol. 1, pp. 405–407, IEEE, 1996; K. I. Kum, W. Sung, and M. Jeong. "Multiprocessor scheduling of a signal flow graph for workstation clusters," *Conference Record of Thirtieth Asilomar Conference on Signals, Systems and Computers*, vol. 2, pp. 1364–1367. IEEE Computer Society Press, 1997; W. Sung, S. K. Mirta, and B. Jeren. "Multiprocessor Implementation of Digital Filtering Algorithms Using a Parallel Block Processing Method," *IEEE Transactions of Parallel and Distributed Systems*, vol. 3, no. 1, pp. 110–120, January 1992; W. R. Stevens, *TCP/IP Illustrated, Volume* 1: *The Protocols,* Addison-Wesley, 1994, the contents of which are incorporated by reference herein. It will also be understood that the systems described herein provide advantages over the prior art. Accordingly, it will be understood that the invention is not to be limited to the embodiments disclosed herein, but is to be understood from the following claims, which are to be interpreted as broadly as allowed under the law.

What is claimed is:

1. A system for implementing a communications process for communicating via a plurality of wireless communication protocols, comprising
- a cluster having two or more processing elements with a processor having a memory management unit capable of supporting an operating system that separates application-level and system-level address spaces,
- a network for data communication among the processing elements,
- programs executing within respective application-level spaces of the two or more processing elements for collectively processing digitized IF signals as required to implement the physical layer of the wireless communication protocols wherein such programs process such IF signals within a latency period corresponding to an associated wireless communication protocol, and
- a configuration module for selectively activating one of said application-level programs for processing signals according to a selected wireless communication protocol,
- wherein the configuration module includes a process for changing support for a wireless communication protocol by causing processing elements supporting the specified protocol to change a processing capacity of said supported protocol.

2. A system according to claim 1 wherein the two or more processing elements are selected from the group consisting of workstations, and workstation motherboards.

3. A system according to claim 1, wherein each of the two or more processing elements has a central processing unit, random access memory, and I/O interface.

4. A system according to claim 1, wherein the two or more processing elements are disposed at remote locations relative to each other.

5. A system according to claim 1, further comprising a program for performing within application level space one or more of the physical, MAC, link, network, transport, or presentation layer processing functions for communicating via a wireless communication protocol.

6. A system according to claim 1,
- wherein the process removes support by sending a message to the executing application-level programs performing processing functions in support of the specified protocol, the message including instructing for changing an internal configuration into a configuration in which these functions are not carried out.

7. A system according to claim 1 wherein the process for changing the processing includes increasing the processing capacity dedicated to support said protocol, wherein the process causes at least some of the processing elements supporting said protocol to begin performing such processing.

8. A system according to claim 1 wherein the process for changing the processing includes decreasing the processing capacity dedicated to support said protocol, wherein the process causes at least some of the processing elements supporting said protocol to cease supporting said protocol.

9. A system according to claim 1 wherein the system functions as a plurality of base stations for a plurality of mobile communication networks, such networks employing a plurality of communication protocols.

10. A system according to claim 1, wherein the signal processing system includes a plurality of workstations coupled through a network system for processing data signals for supporting a plurality of air standards.

11. A method for using the system according to claim 1 for selecting an air standard for transmitting information over a wireless network, comprising
- having the system identify the entity that requested the transmission,
- having the system identify the air standard associated with such entity, and
- directing the system to process the transmission according to the selected air standard.

12. A method for using a system for processing a given transmission in accordance with an air standard appropriate for that transmission, the system including:
- a cluster having two or more processing elements with a processor having a memory management unit capable of supporting an operating system that separates application-level and system-level address spaces,
- a network for data communication among the processing elements,
- programs executing within respective application-level spaces of the two or more processing elements for collectively processing digitized IF signals as required to implement the physical layer of the wireless communication protocols wherein such programs process such IF signals within a latency period corresponding to an associated wireless communication protocol, the method comprising
- having the entity that requested such transmission attach a tag to information sent to the system, which tag identifies the air standard appropriate for that transmission,
- providing a process in the system that reads the tag and forwards the transmission request to the process in the system corresponding to that tag, which correspondence is stored in the system, and
- having the process perform the signal processing in accordance with the specified air standard such that the data is formatted appropriately for transmission via that air standard.

13. A method for using a system for interoperation between a plurality of wireless communication protocols, the system including:
- a cluster having two or more processing elements with a processor having a memory management unit capable of supporting an operating system that separates application-level and system-level address spaces,
- a network for data communication among the processing elements,
- programs executing within respective application-level spaces of the two or more processing elements for collectively processing digitized IF signals as required to implement the physical layer of the wireless communication protocols wherein such programs process such IF signals within a latency period corresponding to an associated wireless communication protocol, the method comprising
- configuring the system with a plurality of communication channels, each configured with one of a the plurality of wireless communication protocols,
- detecting a party communicating via one of the channels having reserved the channel for transmission, and executing the mechanisms appropriate to reserve the transmission channel on the remaining channels according to their respective protocols, having the system receive the information transmitted by such party and retransmit such information over the remaining channels in accordance with their respective protocols, and detecting that the channel reservation acquired by such party has been released, and releasing the reservation acquired on the remaining channels according to their respective protocols.

14. The method of claim 13, wherein the system functions as a router between two or more wireless networks.

15. The method of claim 14, wherein the router employs a local-area data network selected from the group consisting of IEEE802.11 and Bluetooth.

16. A system according to claim 1, wherein the system functions as test equipment for wireless systems.

17. A system according to claim 1, wherein the network is an Ethernet network.

18. A system according to claim 1, wherein the processing elements include interfaces connected to an I/O bus.

* * * * *